Feb. 21, 1956
M. ANTONAZZI
2,735,368
FUEL CONTROL SYSTEM
Filed May 15, 1950
2 Sheets-Sheet 1
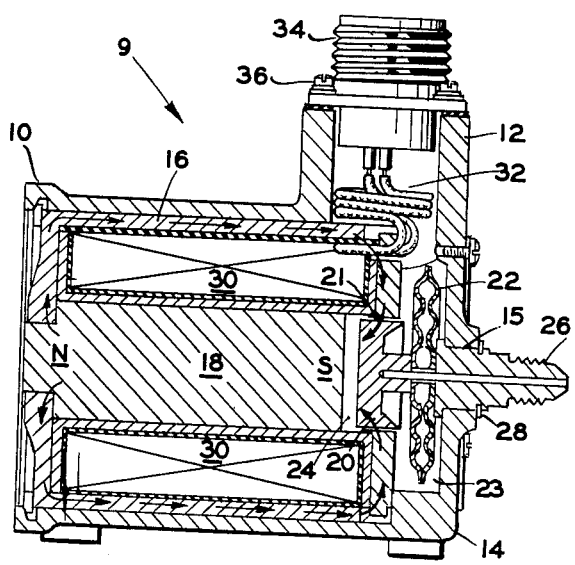
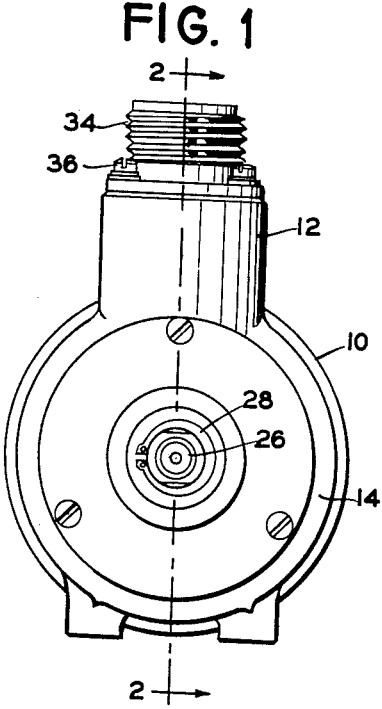
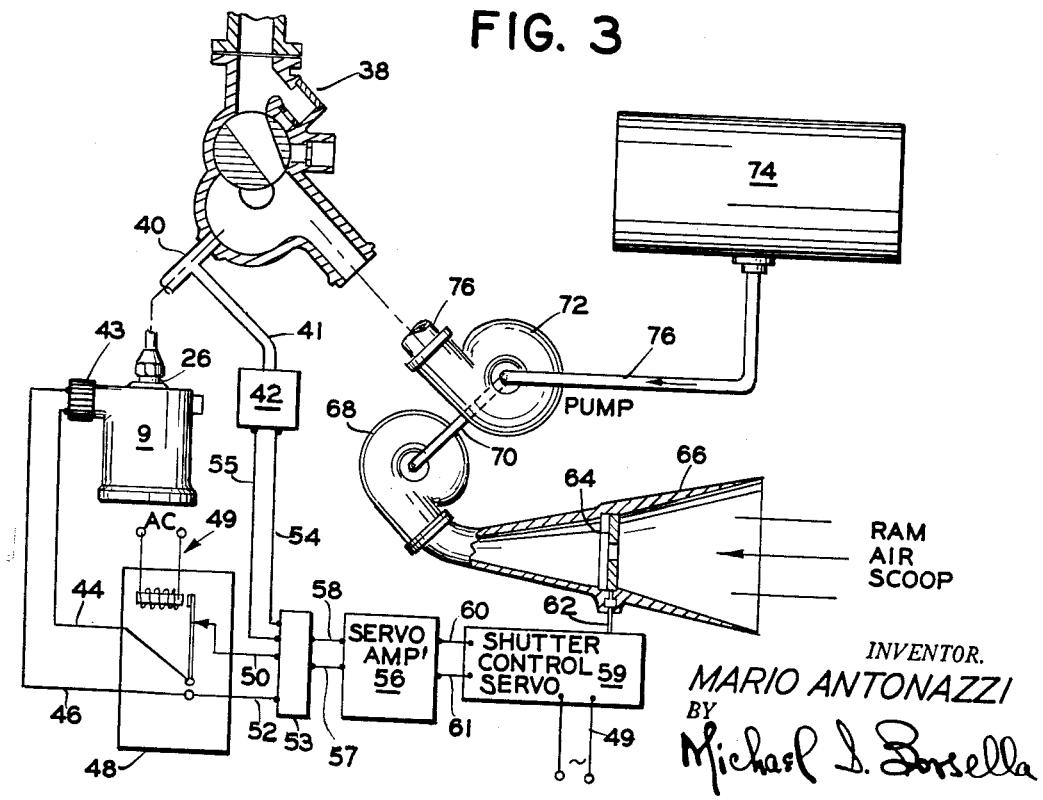
INVENTOR.
MARIO ANTONAZZI
BY
Michael S. Borsella
ATTORNEY

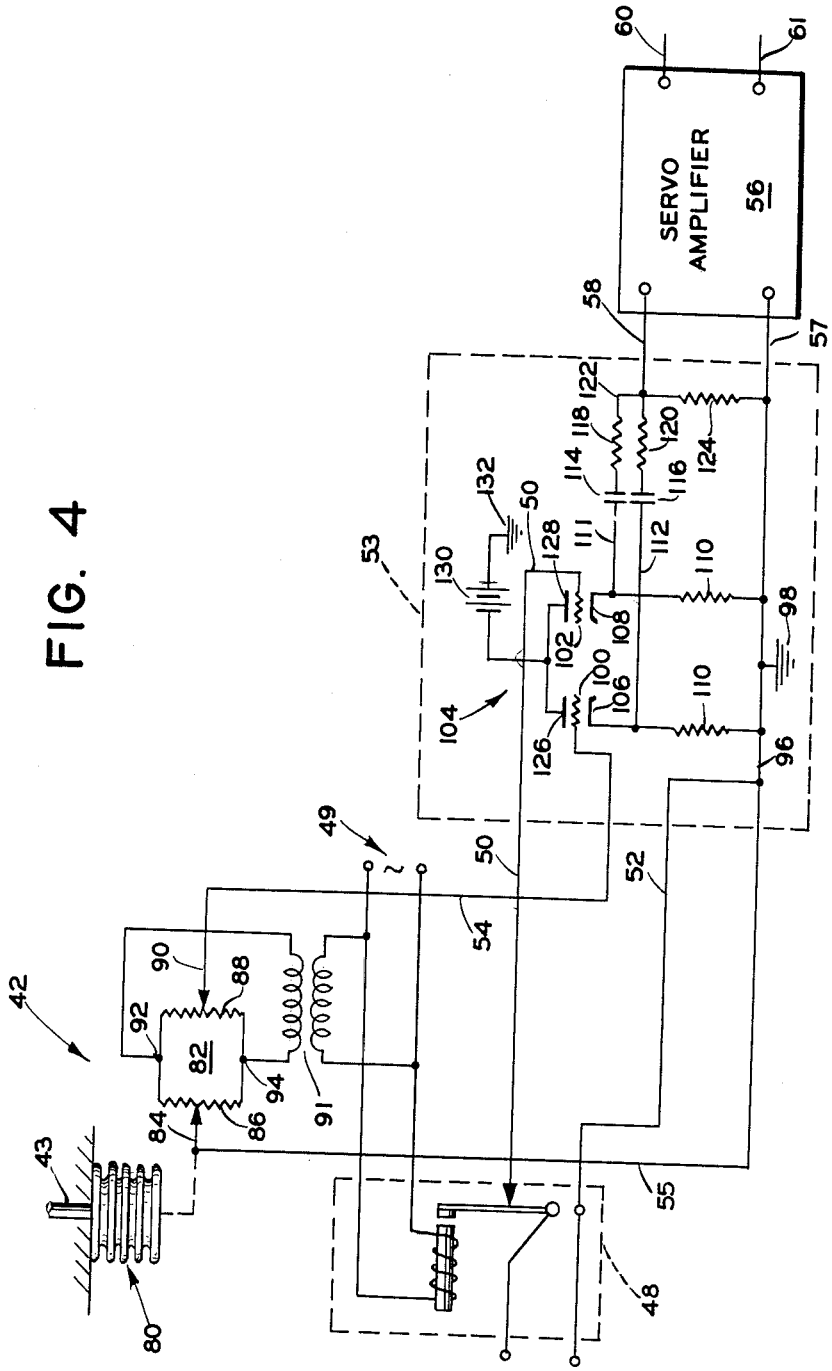

United States Patent Office 2,735,368
Patented Feb. 21, 1956

2,735,368

FUEL CONTROL SYSTEM

Mario Antonazzi, Cresskill, N. J., assignor to Bendix Aviation Corporation, Teterboro, N. J., a corporation of Delaware Application May 15, 1950, Serial No. 162,104

7 Claims. (Cl. 103—13)

The present invention relates to means for sensing the rate of change of fluid pressure and to apply a signal proportional to the rate of change in the stabilization of an automatic control system.

The invention is particularly adapted to sense such rate of pressure variation in a fuel flow system or fluid control system or the like. In the design of automatic control systems wherein one of the variables is the pressure, or the rate of flow of a fluid, the need often arises for a signal relevant to the rate of change of pressure, which may be employed to stabilize the system.

In its broad aspect, the invention contemplates the provision of a device for inducing a voltage upon a conductor by varying the strength of a magnetic field surrounding the conductor, by varying an air gap in the magnetic circuit in response to pressure changes in the fluid system under control. The device is constructed to provide a substantially constant magnetic field in which a coil is positioned adapted to receive an induced voltage. A diaphragm, or equivalent element, is arranged to be subjected to and oscillated in response to the pressure in the fluid system. This diaphragm is associated with a member movable therewith and positioned in the magnetic field. Consequently the diaphragm effects changes in the flow of magnetic flux relative to the coil thereby causing a voltage to be induced upon the latter. The output voltage of said coil may be applied so as to provide a signal to stabilize a fluid flow system as hereinafter explained.

It is, therefore, one of the objects of the present invention to provide means for generating an electrical signal proportional to the rate of change of pressure in a fluid system wherein one of the variables is the pressure or rate of flow.

Another object of the invention is to provide a device of the above indicated character incorporating a high degree of magnetic efficiency with a relatively small permanent magnet.

Still another object of the invention is to provide a pressure sensing device which shall be simple and rugged in construction yet positive and reliable in operation.

The foregoing and other objects and advantages will appear more fully hereinafter from a consideration of the detailed description which follows, taken together with the accompanying drawing, wherein one embodiment of the invention is illustrated by way of example. It is to be expressly understood, however, that the drawings are for the purpose of illustration only and are not to be construed as defining the limits of the invention.

Referring to the drawing wherein like reference characters designate like parts, Figure 1 is an end view of the pressure sensing device.

Figure 2 is a section view taken along the line 2—2 of Figure 1.

Figure 3 is a schematic drawing of a system embodying the device.

Figure 4 is a wiring diagram showing the manner in which the electrical signals from the sensing devices are combined.

Referring now to the drawings, and more particularly to Figures 1 and 2, a pressure sensor 9 comprises a substantially cylindrical casing 10 including a smaller intersecting cylindrical portion 12 and end portion 14 with an opening 15 therein.

The interior of the casing 10 houses a ferrous, or otherwise magnetically highly permeable cage 16 which encompasses the core of the permanent magnet 18. The cage 16 is completely integral except for a plunger 20 at one end thereof. The plunger 20 which is made of the same material as the cage 16, is attached to a differential bellows 22 housed in a bellows chamber 23 and the plunger 20 will, therefore, oscillate with the bellows 22 to thereby vary an air gap 24 between the permanent magnet 18 and the plunger 20. A clearance air gap 21 between the periphery of the plunger 20, and the cage 16 allows free movement of the plunger 20. The gap 21 is small compared to the gap 24 so that its relative contribution to the reluctance of the magnetic circuit is negligible.

A pressure fitting 26 projects through the opening 15 and communicates with the interior of bellows 22, and is adapted to conduct the pressure of the fluid under observation therein. A snap ring 28 secures the fitting 26 firmly to the end portion 14.

A wire coil 30 of a relatively large number of turns, is wound about the permanent magnet 18 and the wires leading therefrom as at 32 are soldered, or suitably connected to an electrical connector 34 which is attached to the smaller cylindrical portion 12 by screws 36.

Referring now to Figure 3 wherein one application of the device is illustrated in a fuel flow control system; a sequence fuel flow control valve 38 of the type more specifically shown and described in application Serial No. 144,504, filed February 16, 1950, which issued as Patent Number 2,658,331 on November 10, 1953, in the name of Thomas W. Johnson and assigned to Bendix Aviation Corporation, connects by means of conduit 40 to the fitting 26 of the pressure sensor shown in Figures 1 and 2.

Connected to the same pressure conduit 40, by means of a conduit 41, is a pressure sensor 42 of a type well known in the art, and shown schematically in Figure 4.

A plug 43 adapted to mate with the receptacle 34, and wires 44 and 46 therefrom lead to a synchronous chopper 48 of a type well known and commonly used in the art. The chopper 48 is adapted to receive a current from the rate of change of pressure sensor 9, and to convert said current into an alternating current which will be of the same frequency as the line 49 which leads from a suitable source of constant frequency alternating current.

Wires 50 and 52 lead from the chopper 48 to a junction box 53, shown schematically in Figure 4, while wires 54 and 55 lead from the pressure sensor 42 to the junction box 53. As will be hereinafter explained, the signals from the pressure sensor 42, and the rate of change of pressure sensor 9 are therein combined and summed to stabilize the system.

A conventional servo amplifier 56 connects to a pair of power leads 57 and 58, from the junction box 53, and is in turn connected to a shutter control servomotor 59 by means of wires 60 and 61. The motor 59 may be of the conventional two phase type having one phase connected across lines 49 and the other phase controlled through lines 60 and 61.

The shutter control servomotor 59 actuates a rod 62 in a direction depending upon the phase of the current across lines 60 and 61 so as to vary the opening of a series of shutters 64 to control the quantity of air passing through a ram air scoop 66. The scoop 66 supplies air to a turbine 68 which by means of a coupled shaft 70 drives a fuel pump 72. The pump 72 draws fuel from a reservoir 74 through a conduit 76 and passes it into the valve 38 through a conduit 78 from whence the fuel is supplied to a combustion chamber or the like, not shown here.

Referring now to Figure 4, the pressure sensor 42 comprises an expansible bellows 80 subject to the fuel pressure in valve 38 and adapted to control the balance of a Wheatstone bridge 82 in response to changes in fuel pressure by means of a variable contactor arm 84 adjusted by the bellows 80 along the variable resistor 86 of the bridge 82. An opposite variable resistor 88 of the bridge may be adjusted by a contactor arm 90 to select the pressure at which the bridge will be balanced.

A transformer 91 has a primary winding connected across the lines 49, and a secondary winding connected across junctions 92 and 94 of the bridge 82 to provide excitation therefor of the same frequency as the lines 49.

Referring again to Figure 4, and particularly to that portion thereof within the confines of junction box 53, the wires 52 and 55 are connected to a wire 96 which is grounded as at 98. The wires 50 and 54 connect to the respective grids 100 and 102 of a twin triode vacuum tube 104. The cathodes thereof 106 and 108 are connected to cathode resistors 110 which in turn connect to the wire 96. The cathodes 106 and 108 also connect by means of wires 111 and 112 to condensors 114 and 116 and thence to isolating resistors 118 and 120. Thereupon, a wire 122 joins the resistors 118 and 120, and also connects them to a summing resistor 124 which connects to wire 96. The wires 60 and 61 connected across the summing resistor 124 are then connected to the conventional servo amplifier 56, as aforenoted.

A pair of anodes 126 and 128 for the twin triode 104 connect to a D. C. source 130 which is then grounded as at 132.

Having thus described the invention, in operation it will now be apparent to those skilled in the art that when system pressure as through conduit 40 in Figure 3 is applied through the nipple 26 to the bellows 22, a change in the contour of the bellows will occur which in turn will actuate the plunger 20 to vary the air gap 24.

The magnet 18 is a permanent magnet of a type well known, and since the cage 16 is made from a ferrous material, the field about the magnet 18 will be such that the flux will tend to follow the magnetically permeable cage 16 from an arbitrarily selected north pole to the south pole as indicated by the arrows in Figure 2, thereby linking the turns of the coil 30. The quantity of flux linking the coil 30 will be varied by the gap 24. The gap 24 is directly proportional to the system pressure at any given time, and therefore, the strength of the magnetic field will be proportional to the pressure of the system and the total flux across the air gap 24 proportional to the system pressure. It follows then that the rate of change of flux linking coil 30 and, therefore, the voltage induced is directly proportional to the rate of change of system pressure.

Referring therefore to Figures 3 and 4, the pressure sensor 42 emits an electrical signal indicating deviations from the desired system pressure and passes such signal into the junction box 53. The pressure rate of change sensor 9 emits an electrical current as hereinbefore described, in response to changes in rate of change of fuel pressure through the valve 38. Said current is fed into the chopper 48 through wires 44 and 46, and is there converted into an alternating current of line frequency and fed into the junction box 53 by means of wires 50 and 52. The alternating current across lines 50 and 52 will be either in phase or 180 degrees out of phase with the line current 49 depending upon whether the rate of pressure change is increasing or decreasing while the alternating current across lines 54 and 55 from the pressure sensor 42 will be either in phase or 180 degrees out of phase with the line circuit 49 depending upon whether the sensed pressure is above or below the predetermined desired pressure. The signals from the pressure sensor 42 and rate of change sensor 9 act in a like sense when the sensed pressure is above the predetermined value and the rate of pressure change is increasing and when the sensed pressure is below the predetermined value and the rate of pressure change is decreasing. However, the signal from the rate of pressure change sensor 9 acts in opposition to the signal from the pressure sensor 42 when the sensed pressure is above the predetermined value and the rate of pressure change is decreasing and when the sensed pressure is below the predetermined value and the rate of pressure change is increasing so as to prevent overshooting of the predetermined pressure value and provide stability of control.

As shown in Figure 4, the voltages from the pressure sensor 42 and the rate of change of pressure sensor 9, applied through wires 54 and 50, respectively, are applied to the grids 100 and 102 of the twin triode 104. The sections of the twin triode 104 are connected as cathode followers, with resistors 110 serving as load resistances, thereby providing high impedance inputs and low impedance outputs from wire 111 to ground, and from wire 112 to ground.

The output voltage of each cathode follower is added at summing resistor 124 through the coupling condensers 114 and 116 and isolating resistors 118 and 120, which also serve to control the ratio between the signals from the rate of pressure sensor 9, and the pressure sensor 42.

The voltage developed across the summing resistor 124 is fed to the conventional servo amplifier 56 through wires 57 and 58.

The pressure sensor 42 is originally set at some desired pressure at which the bridge 82 will be balanced. If the system pressure increases above said point, the deviation sensor 42 will emit a voltage of a given phase. The rate of change of pressure sensor 9 will also emit a signal of a voltage of the same phase when the rate of change is increasing and the opposite phase when the rate of pressure change is decreasing as heretofore explained. The signals are combined through wires 111 and 112, and condensors 114 and 116 and resistors 118 and 120, at the summing resistor 124 where the algebraic addition of the signals takes place. The input to the amplifier 56 then is amplified and supplied to the control winding of the shutter control servo motor 59 by means of wires 60 and 61 to actuate the shaft 62 in a direction so as to cut down the amount of ram air from the scoop 66 supplied through the shutters 64 to the turbine 68. The speed of the turbine 68 is thereby reduced, which in turn reduces the speed and output of the pump 72 which results in lower fuel pressure through the valve 38 until the pressure reaches the point at which the Wheatstone bridge 82 is balanced. This control signal is subject to the action of the rate of pressure change sensor 9 as heretofore explained so as to provide stability of control.

In the event of a decrease in the sensed pressure the voltage induced in the winding 30 and the signal emitted from the sensor 9 will be of an opposite polarity from that emitted upon an increase in the rates of change of pressure. The signal will pass into the chopper where it will be transformed into an alternating current of the same frequency as line current 49 but either in phase or 180 degrees out of phase with the line current 49 depending upon whether the rate of pressure change is increasing or decreasing as heretofore explained. This signal is then fed into the junction box 53, and at summing resistor 124 the algebraic addition thereof with the signal from pressure sensor 42 occurs so that the input into the amplifier and thence into the servo 59 to cause the shutter control 64 to regulate the air to the turbine 68, thereby resulting in an over-all system pressure regulation until the predetermined fuel pressure value is again attained.

It is to be noted that the control exercised over the shutter varies is subject to the pressure rate of change as well as to the pressure deviation, thereby providing a stable high speed control system.

It is also to be noted that since the coil 30 comprises a relatively large number of turns, a relatively small permanent magnet as 18 may be satisfactorily employed to produce a signal of relatively high voltage.

There are thus provided simple, positive and reliable means for generating an electric signal proportional to the rate of change of pressure in a fluid flow system.

Although only one application and one embodiment of the invention has been illustrated and described, other changes and modifications in form and in the relative arrangement of the parts, as will occur to those skilled in the art, may be made without departing from the spirit and scope of the invention.

I claim:

1. In a fuel flow system wherein a ram air scoop provides driving fluid to a turbine, which drives a fuel pump to supply fuel to a combustion chamber, in combination therewith, a fuel valve, a fuel pressure lead on said valve, a casing, a magnet axially disposed in said casing, a coil wound around said magnet, a magnetically permeable cage about said magnet in contact with one pole thereof defining a magnetic path, said case being broken at the other pole of said magnet to interrupt said path, a diaphragm at said other pole of said magnet, conduit means connecting said pressure port to said diaphragm, a magnetically permeable plunger movable with said diaphragm adapted to complete said magnetic path, a synchronous chopper, said coil connected to said chopper, a pressure sensor, said sensor connected to said fuel pressure lead to convert said pressure into an electrical current, an amplifier and a servo, a twin triode, said chopper feeding current to one grid of said triode, the current from said sensor connected to the other grid of said triode, the cathodes of said triode being grounded, a summing resistor, said cathodes connected to said summing resistor so as to combine said currents fed into said grids, the sum of said currents fed into said amplifier to drive said servo, said servo governing the flow of air through said scoop to regulate the speed of said turbine and pump and thereby stabilize said fuel flow in said system.

2. In a fluid control system, wherein a fluid driven turbine drives a pump which supplies fluid from a reservoir to a sequence valve or the like, in combination therewith, a rate of pressure change sensing device, a pressure deviation device, both said devices connected to said valve, said devices transforming pressure changes in said system into electrical currents, a synchronous chopper, said chopper converting the current from said rate of change of pressure sensing device, a junction box including means for the algebraic summing of said currents, an amplifier, the sum of said currents amplified by said amplifier, a control servo driven by the output from said amplifier, said control servo regulating the quantity of driving fluid supplied to said turbine, to regulate the speed of said pump and thereby the fluid flow in said system.

3. In a fuel flow system wherein a ram air scoop provides driving fluid to a turbine, which drives a fuel pump to supply fuel to a combustion chamber, in combination therewith, a fuel valve, a fuel pressure lead on said valve, a casing, a magnet axially disposed in said casing, a coil wound around said magnet, a magnetically permeable cage about said magnet in contact with one pole thereof defining a magnetic path, said cage having an opening therein to interrupt said path, a diaphragm, conduit means connecting said pressure port to said diaphragm, a magnetically permeable plunger movable with said diaphragm adapted to vary said magnetic path, a synchronous chopper, said coil connected to said chopper, a change of pressure sensing device, said device connected to said fuel pressure lead, said device converting said pressure into an electric current, means for summing said current with the current from said chopper, an amplifier and a servo driven thereby, said summation of currents fed into said amplifier, said servo governing the flow of air through said scoop to regulate the speed of said turbine and pump and thereby stabilize the fuel flow in said system.

4. For use in a fuel flow control system where a ram air scoop supplies driving fluid to a turbine to drive a fuel pump, said pump passing fuel through a balanced valve to a combustion chamber, the combination comprising a change of pressure sensor and a rate of change of pressure sensor, said change of pressure sensor being set at a desired system pressure, said sensors emitting electrical signals proportional to the change of pressure and rate of change of pressure in said fuel system, respectively, a chopper having a control winding connected to a main source of constant frequency alternating current, the signal from the rate of change of pressure sensor being passed through the chopper to provide a signal alternating current having a constant frequency corresponding to that of the main source of alternating current, said last-mentioned signal being applied to a twin triode, the sections of said triode being connected as cathode followers, the output of said followers being combined at a summing resistor, an amplifier having an input connected across said summing resistor, the current from said summing resistor being fed into said amplifier, a polyphase alternating current reversible servo motor having one winding connected to the main source of alternating current and another winding connected to the output of said amplifier, a shutter control on said air scoop, said servo motor actuating said control to regulate the quantity of ram air through said scoop and thereby the speed of said turbine and fuel pump to stabilize said system at said desired point.

5. For use in a variable fluid pressure system; a device for supplying a voltage to an electrical network of a magnitude and phase dependent upon the change in the fluid pressure of said system; said device comprising a casing, a magnet axially disposed therein, a coil wound about said magnet, a permeable cage about said coil and providing a magnetic path between the poles of said magnet, said cage having an opening therein to interrupt said path, a bellows subject to the fluid pressure in said system, said bellows having an end supported by an inner surface of said casing and a movable end, a plunger movable in the opening in said magnetic path by the movable end of said bellows to vary the flux in said magnetic path upon change in the fluid pressure to induce a voltage in said coil of a magnitude and phase dependent upon the change in the fluid pressure, means for directing the fluid pressure from the system into said bellows, and means for connecting the induced voltage in said coil into said electrical network.

6. For use in a variable fluid pressure system of the character described, a device for supplying a voltage to an electrical network of a magnitude and phase dependent upon the change in the fluid pressure of the system; the device comprising a cylindrical hollow casing, a core magnet axially disposed in the casing parallel to the cylindrical wall thereof, a magnetically permeable cylindrical cage disposed around the magnet but spaced therefrom, a pole of the magnet axially mounted in an end wall of the cage, an induction winding about the magnet, a bellows having a free face axially aligned with the opposite free pole of the magnet and having its other face affixed to an inner wall of the casing, a magnetically permeable cylindrical plunger of thickened proportions axially supported by the free face of the bellows in opposed space relation to the free pole of the magnet, the plunger adapted to move to and from the free pole with reciprocating movements of the bellows in response to fluid pressure changes in the system, the plunger forming a continuous magnetic circuit with the cage, movement of the plunger serving to induce a voltage in the winding of a magnitude and phase dependent upon the change in fluid pressure, a fitting attached to the casing in axial alignment with the bellows for applying the fluid pressure in the system to the bellows, and means on the casing for connecting the induced voltage in the winding into the said electrical network.

7. For use in a variable fluid pressure system; a device for supplying a voltage to an electrical network of a magnitude and phase dependent upon the change in the fluid pressure of said system; said device comprising a hollow cylindrical casing, a magnet axially disposed in said casing, a coil about said magnet, a magnetically permeable cage about said coil and in contact with one pole of the magnet, a bellows subject to the fluid pressure in said system, said bellows having an end affixed to an inner surface of said casing and a free end opposite the other pole of said magnet, a cylindrical magnetically permeable plunger of a diameter substantially that of the magnet supported by said free end of the bellows and movable therewith upon change in the fluid pressure of said system to vary the distance from said pole to said plunger to induce a voltage into said coil of a magnitude and phase dependent upon the change in the fluid pressure, said plunger forming a substantially continuous magnetic circuit with said cage, a fitting for applying the fluid pressure in said system to said bellows, means on said casing for connecting the induced voltage in said coil into said electrical network, the casing cage and magnet being coaxial with one another and the plunger being axially aligned with the magnet.

References Cited in the file of this patent

UNITED STATES PATENTS

| | | |
|---|---|---|
| 2,119,811 | Green | June 7, 1938 |
| 2,320,881 | Newton | June 1, 1943 |
| 2,396,703 | Kamler et al. | Mar. 19, 1946 |
| 2,430,757 | Conrad et al. | Nov. 11, 1947 |
| 2,509,210 | Clark | May 30, 1950 |
| 2,511,752 | Tandler et al. | June 13, 1950 |